United States Patent [19]

Marsaud et al.

[11] Patent Number: 5,272,740
[45] Date of Patent: Dec. 21, 1993

[54] AGENT FOR TRAPPING THE RADIOACTIVITY OF FISSION PRODUCTS WHICH ARE GENERATED IN A NUCLEAR FUEL ELEMENT

[75] Inventors: Serge Marsaud, Voiron; Bertrand Morel, Moirans, both of France

[73] Assignee: Uranium Pechiney, Courbevoie, France

[21] Appl. No.: 962,738

[22] Filed: Oct. 19, 1992

[30] Foreign Application Priority Data

Oct. 31, 1991 [FR] France ................ 91 13714

[51] Int. Cl.$^5$ ................ G21C 3/00
[52] U.S. Cl. ................ 376/418; 376/184; 252/629; 252/630
[58] Field of Search ............ 376/418, 172, 184, 185, 376/420, 163; 976/DIG. 51, DIG. 53; 252/629, 630; 419/19, 20; 428/312.6, 312.8

[56] References Cited

U.S. PATENT DOCUMENTS

| | | | |
|---|---|---|---|
| 3,784,384 | 1/1974 | Webb | 106/39 |
| 3,826,754 | 7/1974 | Grossman et al. | 252/301.1 R |
| 3,849,330 | 11/1974 | Isaacson et al. | 252/301.1 W |
| 4,006,096 | 2/1977 | Forthmann et al. | 252/301.1 S |
| 4,020,004 | 4/1977 | Schulz et al. | 252/301.1 W |
| 4,257,847 | 3/1981 | Gibby et al. | 376/418 |
| 4,314,909 | 2/1982 | Beall et al. | 252/629 |
| 4,473,410 | 9/1984 | Grubb et al. | 148/6.3 |
| 4,913,850 | 4/1990 | Puppe et al. | 252/630 |
| 5,091,120 | 2/1992 | Feugier et al. | 264/0.5 |

*Primary Examiner*—Donald P. Walsh
*Assistant Examiner*—Meena Crelliah
*Attorney, Agent, or Firm*—Dennison, Meserole, Pollack & Scheiner

[57] ABSTRACT

An agent for trapping the radioactivity of the fission products which appear in a nuclear fuel based on sintered uraniferous oxides in the course of irradiation characterized in that it comprises a stable oxygenated compound, a combination of at least two metallic oxides and at least one oxide of a non-radioactive isotope of the radioactive fission product or products whose radioactivity is to be trapped.

12 Claims, No Drawings

AGENT FOR TRAPPING THE RADIOACTIVITY OF FISSION PRODUCTS WHICH ARE GENERATED IN A NUCLEAR FUEL ELEMENT

TECHNICAL FIELD

The present invention concerns an agent for trapping the radioactivity of fission products which appear in a nuclear reactor fuel element in the course of combustion, that agent comprising a stable oxygenated compound of the fission products.

Such a trapping agent is in particular adapted to long-life radioactive fission products such as Cs, Sr ... which are generated in the course of irradiation in a nuclear reactor.

STATE OF THE ART

Reactors of the PWR, BWR or fast neutron type which use fuel pellets based on sintered oxide $UO_2$ or mixed oxides generate 'in situ' fission products of which some are not specifically gaseous in the core of the reactor. In normal operation those solid fission products remain generally in place in the pellets although in regard to some thereof migration phenomena may occur, which are due to the temperature differences between the core and the periphery of a pellet, towards the outside of the pellet. Even in that case however the major part thereof remains confined in the fuel pellets.

The fission products appear in the pellets in elementary form and may form compounds, which are relatively stable at the temperature of the core of the reactor (300° to 900° C.), with the nuclear fuel oxides which form the pellets.

However, in the case of a major accident which causes an excessive rise in temperature in the core of the reactor, followed by damage to or even fusion of the core, such compounds are insufficiently stable and the fission products are then liberated, with serious risk of dissemination into and contamination of the environment; that risk is more especially severe as such fission products have long lives (some tens of years). That is the case for example with Cs 137 and Sr 90.

An arrangement which makes it possible to trap caesium in normal operation in a fast neutron reactor has been proposed in patent FR 2438319 (Westinghouse); it comprises interposing between the fissile and fertile fuel elements Cs captors which are formed by pellets of low density and particular shape and which consist of $TiO_2$ or $Nb_2O_5$. Those oxides fix Cs at the usual temperature in the core of the reactor and the shape of the pellets makes it possible to avoid any stress, due to swelling which occurs in the course of normal operation of the reactor, on the sheathing of the fuel element. In that arrangement, it appears that the caesium has to reach the pellets of captors in order to be trapped and that only Cs which has migrated to a sufficient degree is actually trapped.

In the event of a major accident such an arrangement would be found to be insufficiently effective to prevent all dissemination of the Cs; in fact, all the free Cs which has not yet been trapped but which is present in the fuel pellets could escape from the sheathing and contaminate the environment, as the trapping speed is not fast enough. In addition compounds such as $CsNbO_3$ or $Cs_2Ti_2O_5$ formed in the trapping operation seem to be of insufficient stability at very high temperature (for example above 1600° C.).

That is why the applicants sought a way of trapping the dangerous fission products, as far as possible as soon as they appear in the course of irradiation, in particular in the mass of the fuel pellets.

The applicants also sought a trap which is sufficiently stable and effective so that the fission products are not removed again at elevated temperatures (which can attain or exceed 1600° C. or in the event of core fusion or melt-down) and which is in any case more stable than the compounds which are formed in situ between uranium oxide and the fission products (for example Cs).

The applicants also sought to provide a trap which does not give rise to fusion or premature incipient fusion of the fuel pellets in the event of a major accident, in other words a trap which does not perform a fusioning function in relation to the pellets which will thus retain adequate refractoriness.

DESCRIPTION OF THE INVENTION

The invention is an agent for trapping the radioactivity of the fission products which appear in a nuclear fuel based on sintered uraniferous oxides in the course of irradiation, which is stable at elevated temperature, characterised in that it comprises a defined stable oxygenated compound, a combination of at least two metallic oxides and at least one oxide of a non-radioactive isotope of the radioactive fission product or products whose radioactivity is to be trapped.

That trapping agent is in general used in the production of the nuclear fuel elements which usually comprise pellets of sintered uraniferous oxide which are surrounded by a metal sheath in the shape of a needle or stick or rod and, according to the invention, the trapping agent.

The stable oxygenated compounds which are in general defined, according to the invention, are generally put into fine powder form before being introduced into the fuel element.

That introduction operation is generally effected as follows:

either by incorporating the powder or the powdery components which make it possible to produce the stable oxygenated compound, in the fuel oxide powder prior to pressing in the form of pellets and sintering; that gives a sintered fuel pellet containing both the fuel oxide and the trapping agent and serving for production of the fuel element;

or by coating the pellets of fuel oxides with the powder by any means known to the man skilled in the art (for example by applying a wash, by hot spraying ... );

or by coating the internal wall of the sheath containing the fuel pellets, the sheath generally being in the form of a needle or rod or stick, using any means known to the man skilled in the art.

The term stable oxygenated compounds is generally used to mean those which suffer little or no decomposition at high temperature, that is to say at temperatures which attain or exceed 1600° C. (or better, higher than 2000° C.) which may occur in a nuclear reactor core in a major accident situation, including the situation involving fusion or melt-down of the core.

They are in particular more stable than those which may be formed between uranium oxide and caesium. They must also remain inert and non-volatile in the initial sintering of the uraniferous pellet, for example in a reducing atmosphere.

They are generally selected from combinations of two at least of the following metallic oxides: $Al_2O_3$, $CeO_2$, $Nb_2O_5$, $SiO_2$, $TiO_2$, $UO_2$, $V_2O_3$, $Y_2O_3$, $ZrO_2$ and preferably $Al_2O_3$, $Nb_2O_5$, $SiO_2$, $TiO_2$, $UO_2$ and $ZrO_2$, with one at least of the oxides of non-radioactive isotopes of the radioactive fission products, for example $Cs_2O$ and/or $SrO$.

The trapping stable oxygenated compound may involve the addition of another stable defined compound, for example an oxide, of another alkali metal (such as $Rb_2O$, $Na_2O$ or $K_2O$) and/or alkaline-earth metal (or assimilated) such as $BaO$, $CaO$, $SrO$, or $MgO$, to promote the trapping action by a dilution effect.

The invention is particularly suited to the trapping of Cs but it may also be extended to Sr or other radioactive fission products.

The stable oxygenated compounds are therefore mixed compounds which are at least ternary but also quaternary compounds, that is to say containing at least three or four metallic elements, including for example non-radioactive Cs or stable isotopes of the fission products to be trapped. It is possible for example to use compounds of alumino-silicates (which for example have a high alumina content), alumino-titanates (in particular those based on compounds having a structure of the hollandite type), urano-zirconates, titano-niobates but preferably silico-zirconate, -niobate, -cerate, and non-radioactive Cs, which are obtained by any processes known to the man skilled in the art, including direct reaction of the oxides (of the metals and the non-radioactive isotopes) with each other. It is also possible to melt the stable oxygenated compounds and then solidify them in vitreous phase form before crushing them to give a very fine powder and then introducing them into the fuel element.

In particular, as defined stable oxygenated compounds, it is an attractive proposition to use silico-aluminates of the pollucite or zeolite type whose melting point is higher than 1750° C.

Thus the stable trapping agent containing a non-radioactive isotope of the fission product may be pollucite of the approximate formula $CsAlSi_2O_6$ or zeolite containing Cs, which is referred to as Cs-F.

However, Cs having a relatively high neutron capture section, it is possible partially to substitute for or add to the Cs another stable alkali metal compound (preferably in the order Rb, Na or K); it is possible for example to add it in the form of oxide, as already stated, or a stable compound of an approximate formula such as $RbAlSi_2O_6$ and of structure of type analcite, or zeolite containing Rb and referred to as Rb-F, such additives improving the trapping action by a dilution effect.

As regards the trapping of Sr, the addition could be effected by means of alkaline earth oxide, preferably in the order Ca, Ba and Mg.

Trapping of the radioactive fission product occurs in the course of normal operation of the reactor; it is not effected by chemical reaction to form the stable compound, the latter already being present in the fuel, but by isotopic exchange between the radioactive fission product when it appears and its non-radioactive isotope which is present in the stable compound. That gives an equilibrium which results in fixing of the major part of the free fission product which has occurred in the course of irradiation, without having to form the stable compound by chemical reaction in situ.

The isotopic exchange reaction tends to render uniform the distribution of the different isotopes (radioactive or non-radioactive) of the same fission product in the fuel element between the different physico-chemical forms in which they occur.

The exchange can be schematised in the following fashion:

A* representing a radioactive isotope of a fission product,

A representing a non-radioactive isotope of said fission product, and

B representing a complex metallic oxygenated compound which with A gives a stable oxygenated defined compound BA making it possible to trap A* in the form of the same stable oxygenated defined compound BA*.

Distribution of the isotopes being balanced, the ratio of the amount BA initially introduced to the amount of A* which appears in the course of irradiation will determine the effectiveness of the trap; on the other hand the amount BA introduced will have to be compatible with the neutronic characteristics that the fuel element must have.

Thus in the case of a 3.5% uranium enriched fuel which is irradiated at 33,000 MWj/t and cooled for a period of 3 years, the mass of caesium generated (Cs134+Cs135+Cs137) is about 0.3% of the total mass of uranium. To trap approximately 75% of that radioactive caesium, it will be necessary to use an amount of trapping agent BA such that the amount of A is about 0.5% (molar) of the total amount of uranium. However that amount of caesium to be introduced can be reduced by the addition to BA of another alkaline compound (B'A') for example based on Rb or Na, which will produce a supplementary dilution effect.

To promote such exchanges, it may be appropriate to add to the defined compound a mixture of third-party oxides which would make it possible to stabilise the different alkaline compounds; the third-party oxides may be of the type of mixtures of metallic oxides already referred to above.

To illustrate the isotopic exchange, tests were carried out with caesium 137 as a radioactive tracer and non-radioactive Cs 133 in chloride form which is easily available as a radioactivity calibration solution.

Using an Inconel crucible, the procedure involved adding, in defined proportions, finely crushed synthetic pollucite to a solution containing a mixture of dissolved 137 CsCl+133CsCl. After slow evaporation of the solvent, a first gammagraphy was effected so as to measure the initial content of 137Cs. The crucible was then closed by means of a cover and the assembly was raised to 800° C. for a period of 15 days in a neutral atmosphere. A second counting operation was then effected to be sure that no caesium 137 has been lost and then the whole was raised in an open alumina crucible in dry air to 1300° C. to evaporate the caesium which is not fixed (radioactive and non-radioactive), the pollucite being stable at that temperature. A last counting operation was then effected, which showed that the pollucite has become radioactive and that its caesium has therefore been exchanged with radioactive caesium 137 which is thus trapped in a stable compound and which will not be given off again in the event of abnormal and accidental heating.

We claim:

1. An radioactivity trapping agent contained in a nuclear fuel based on sintered uraniferous oxides, for trapping the radioactivity of fission products which appear in the course of irradiation of said fuel, comprising an oxygenated compound stable at high temperatures, including, in combination, at least two metallic oxides and at least one oxide of a non-radioactive isotope of a radioactive fission product which appears during the irradiation, and whose radioactivity is to be trapped.

2. A trapping agent according to claim 1 wherein in the stable oxygenated compound the metallic oxides are selected from the group consisting of $Al_2O_3$, $CeO_2$, $Nb_2O_5$, $SiO_2$, $TiO_2$, $UO_2$, $V_2O_3$, $Y_2O_3$ and $ZrO_2$.

3. A trapping agent according to either one of claims 1 and 2 wherein the metallic oxide is a silico-aluminate, silico-zirconate, silico-niobate or silico-cerate.

4. A trapping agent according to claims 1 or 2 wherein the stable oxygenated compound is pollucite or zeolite containing Cs.

5. A trapping agent according to claims 1 or 2, wherein characterised in that the stable oxygenated compound additionally contains a stable defined compound of an alkali metal and/or alkaline earth metal other than the fission product to be trapped.

6. A trapping agent according to claim 1 or 2, wherein said agent is included in nuclear fuel elements comprising a sintered uraniferous oxide surrounded by a metal sheath.

7. A trapping agent according to claim 6 wherein said agent is included in the sintered uraniferous oxide, the oxide being in pellet form.

8. A trapping agent according to claim 6 wherein said agent coats the sintered uraniferous oxide, the oxide being in pellet form.

9. A trapping agent according to claim 6 wherein said agent internally coats said sheath.

10. A trapping agent according to claim 6 wherein said agent is included in the fuel elements by at least two means selected from the group consisting of inclusion in the oxide, coating the oxide which is in pellet form, and internally coating the sheath.

11. A trapping agent according to claim 5 wherein said stable oxygenated compound comprises Rb, Na or K for Cs or Ca, Ba or Mg for Sr.

12. A nuclear fuel comprising sintered uraniferous oxides which produce radioactive fission products during irradiation of said fuel, and a trapping agent for the radioactivity of said fission products, said trapping agent comprising a high temperature-stable oxygenated compound including, in combination, at least two metallic oxides and at least one additional oxide which is an oxide of a non-radioactive isotope of a radioactive fission product whose radioactivity is to be trapped.

* * * * *